May 31, 1966    W. E. PAKALA ETAL    3,253,457
APPARATUS FOR LOCATING TROUBLE SOURCES WHICH
GENERATE ULTRASONIC VIBRATIONS
Filed Dec. 15, 1961

WITNESSES

INVENTORS
William E. Pakala, John H. Thompson
and Robert A. Lester.

AGENT

United States Patent Office 3,253,457
Patented May 31, 1966

3,253,457
APPARATUS FOR LOCATING TROUBLE SOURCES WHICH GENERATE ULTRASONIC VIBRATIONS
William E. Pakala and John H. Thompson, Pittsburgh, and Robert A. Lester, Pitcairn, Pa., assignors to Westinghouse Electric Corporation, East Pittsburgh, Pa., a corporation of Pennsylvania
Filed Dec. 15, 1961, Ser. No. 159,688
1 Claim. (Cl. 73—71.4)

The present invention relates to an improved apparatus for locating trouble or undesirable working conditions of mechanical, electrical, fluid pressure and other apparatus, and which apparatus is particularly well suited for location of corona discharge on electrical equipment such as utility power transmission lines, etc.

Undesirable working conditions or trouble in various types of equipment is often accompanied by a characteristic noise which has a spectrum including sound waves of ultrasonic frequency. This is true of corona discharge, escaping steam, tapping valves, noisy bearings, etc.

A prime object of the present invention is the provision of apparatus which realizes and utilizes the presence of such ultrasonic sounds for locating the trouble source from which such sound emanates.

In the majority of cases such ultrasonic sound emanating from a trouble source is in the form of pulses of ultrasonic acoustic energy at a repetition rate within the audio frequency range. This is true of corona discharge from conductors of sixty-cycle alternating current, of fluid under pressure escaping from a vessel or conduit, of percussive noises emanating from rotating and reciprocating machinery, etc.

It becomes a further object of the present invention to provide apparatus in accord with the preceding object which further utilizes the audio-frequency nature of such repetitive-ultrasonic trouble-source-sounds to produce an audible signal which is employed in the locating of the trouble source.

It is yet another object of the present invention to provide apparatus for the locating of sound-producing trouble sources in an expeditious, convenient, and facile manner not heretofore contemplated.

Briefly, the present invention accomplishes the above-cited objects by providing and utilizing a highly-directional, sensitive microphone and sighting assemblage which is easily maneuvered for simultaneous, sight-and-sound scanning observance of a trouble area in question. Via electronic components including a speaker, an audible signal is produced which varies in intensity with the intensity of the sound received by the directional microphone. An audible signal indicates to the operator that a trouble source is being observed through the sighting instrument. In being employed to detect the intensity of sound in the ultrasonic range emanating from a trouble source, the feasibility of employing a highly-directive sound sensitive transducer means or microphone assemblage of practical size for hand-held use is afforded, and the relatively great absorption of sound in air at such ultrasonic frequencies affords differences in direct-path sounds and reflected-path sounds great enough to be distinguished audibly in the apparatus of the present invention.

Other objects and advantages of the invention will become apparent from the following detailed description and claims of such invention.

For a better understanding of the invention, reference may be had to the accompanying drawings in which.

Figure 1:
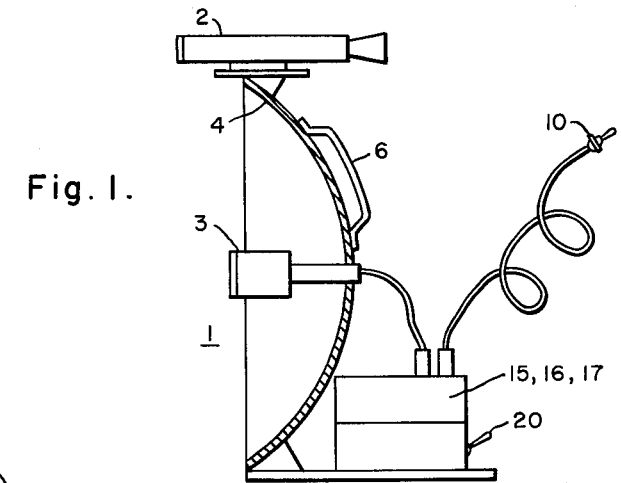
FIG. 1 is a side elevation view, partly in outline and partly in section, of one embodiment of the apparatus of the present invention.

Referring to the drawings, in accord with general features of the novel apparatus of the present invention, a trouble area to be examined, such as electrical line components near the top of a utility power transmission tower, for example, is scanned remotely from the ground by a highly-directional (half-power beamwidth of 1½ degrees, for example) microphone assembly 1 aimed through the medium of an associated sighting means 2, preferably in form of a telescopic sight, as shown, to enable accurate location of a trouble spot considerable distances away, such as the exemplified seventy-five feet; closer observer-to-observed distances of a matter of inches or several feet might better be served by a simpler sighting means.

Figure 2:
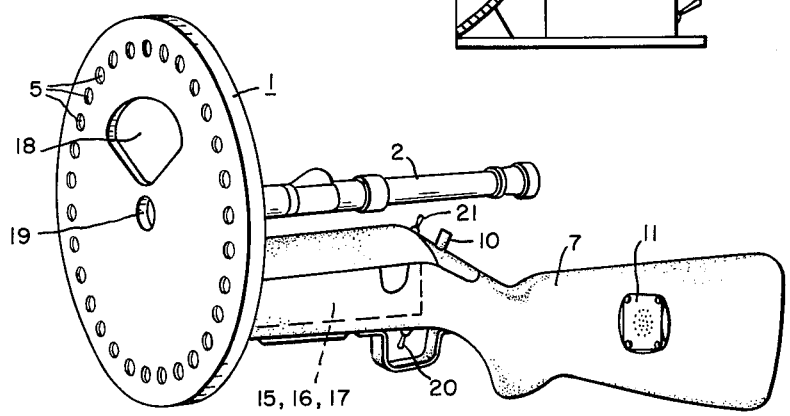
FIG. 2 is a perspective view of a second embodiment of the apparatus of the present invention.

In accord with preferred features of the invention, the highly-directional microphone assembly 1, including a central microphone 3 and parabolic reflector 4 of FIG. 1 or a ring array of circumferentially-spaced-apart microphones 5 of FIG. 2, is sensitive exclusively to acoustic energy in the ultrasonic spectrum. This affords advantages over such an assembly which would be sensitive to acoustic energy at the lower frequencies. A smaller-sized microphone assembly 1 at the desired acoustical directivity is afforded which is suitable for hand-held use, as by the handle 6 attached to parabola 4 in FIG. 1 form and by the gun stock 7 of the FIG. 2 form. Trouble noises tend to be characterized by their inclusion of ultrasonic components, thus enabling the apparatus and method of the present invention to distinguish from high-level background noises in the lower or audio frequency spectrum. Absorption of acoustic energy in air is greater at the higher frequencies than at the lower. The intensity of the trouble sound sensed by the assembly 1 is influenced by the distance that such sound travels in reaching the assembly. Since this travel distance effect is more pronounced at the higher frequencies, the preferred ultrasonic sensitivity of the instant invention enables the direct-path trouble sound to be compared with the lower-intensity reflected-path trouble sounds, thus avoiding false location on a reflective surface rather than on the true trouble sound source.

Working models of both the FIG. 1 embodiment and the FIG. 2 embodiment using commercially-available 40 K c.p.s. microphones have been constructed which afford assembly 1 diameters of fifteen inches or less at major lobe sensitivity beam widths of approximately 1½°, and which take advantage of the above-mentioned audio-frequency background noise elimination as well as the reflected trouble sound discrimination, absorption of sound at this frequency over that at lower frequencies in the audio range being greater by a factor of eight or more.

Use of a microphone having a narrow band frequency sensitivity of 40 K c.p.s. ±2 K c.p.s., eliminates any need for use of high pass filter means to block out the low frequency sounds.

Figure 3:
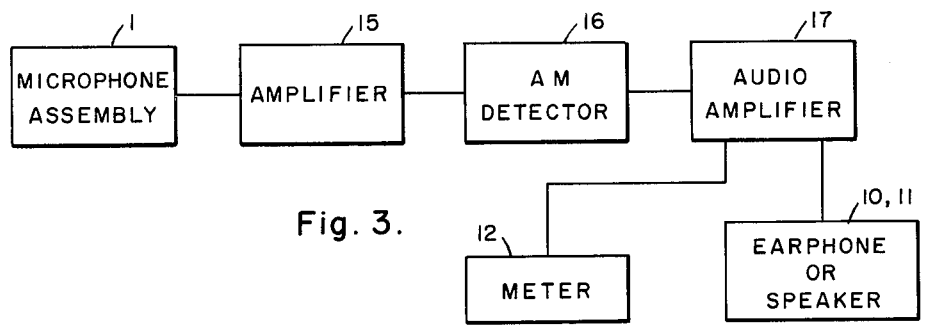
FIG. 3 is a block-diagram representation of the general components comprised in the apparatus of the present invention.

In accord with other features of the invention, the ultrasonic trouble sound when received by the microphone assembly is indicated audibly, for example, such as by an earphone 10 as in FIG. 1, by a loud speaker 11 as in FIG. 2, or other suitable means such as headphones not shown, and/or visually by such as a meter 12 indicated in FIG. 3.

In the producing of an audible and/or visual signal indicative of the presence and intensity of an ultrasonic trouble sound received by the microphone assembly 1, the experimental working models of this invention as shown in FIGS. 1–3, rely on the fact that most ultrasonic trouble sounds are either a series of pulses at an audio frequency rate, as is true with corona discharge from sixty-cycle conductors, tapping noises in rotating machinery, etc., or otherwise modulated at an audio frequency such as may be the case with the ultrasonic component of the sound of fluid under pressure escaping from a leak in an enclosure. The electrical signal produced by the ultrasonic microphone 3 of FIG. 1 or the microphones 5 of FIG. 2 is of the same frequency band and is amplitude modulated in accord with that of the received sound. This signal is amplified by an electronic amplifier 15, demodulated by an amplitude modulation detector 16 and the resultant amplitude modulated output fed to an audio amplifier 17 to drive the audio sound signal means 10, 11. These electronic component devices or assemblies as employed in the exemplified hand-held trouble locator units of FIGS. 1 and 2 are transistorized and battery operated to afford the necessary degree of compactability and portability. The particular circuitry per se of these component assemblies 15, 16 and 17 forms no part of the present invention and has not been disclosed herein. Commercially available assemblies may easily be adapted for the instant use after adequate shielding for use around high voltage power equipment and compaction for mounting on the parabolic reflector 4 of FIG. 1 or disposition within the gun stock 7 of the FIG. 2 form of apparatus.

Once having "homed-in" on a trouble sound source by aiming the directional microphone assemblage 1 of either the FIG. 1 or FIG. 2 form and listening to the output from earpiece 10 or speaker 11, the trouble source will lie within view of the sighting means 2 and can be readily identified for corrections of the fault, as by replacement of a cracked stand-off insulator of a transmission tower, for example.

Where the microphone assembly employs a sound-focusing parabolic reflector 4 as in the apparatus of FIG. 1, it will have a minimum range above the well-known Fresnel zone and below which the assembly becomes ineffective. For a fifteen inch diameter reflector this minimum range is about eight feet. Where a ring array of microphones 5 of FIG. 2 is employed, no such minimum range exists, practically speaking, and the assembly 1 in this form may be brought to within inches of the trouble sound source without affecting the effectiveness of such assembly. Both forms of assembly 1 afford amplification or gathering of the incoming sound; the FIG. 1 form by virtue of the gathering and focusing of the sound to the microphone 3, and the FIG. 2 form by virtue of the multiplicity of microphones 5.

Both ceramic (barium titanate, for example) and capacitor type microphones have been tried with substantially equal success, the former type in the FIG. 1 form and the latter type in the FIG. 2 form.

In the FIG. 1 form the sighting means 2 is mounted at the rim of the reflector 4 to enable general viewing with one eye while sighting with the other. In the FIG. 2 form, general viewing of a trouble area is facilitated by provision of a viewing opening 18 in the plate-like assembly 1 above a central aperture 19 with which the sighting means 2 is in fixed registry.

The electronic components are turned on and off by a suitably located switch 20. A selector switch 21 in the FIG. 2 form enables use of either an earpiece 10 having retractable leads (not shown) normally disposed within the gun stock 7 or the speaker 11 mounted in such stock.

While there have been shown and described what are at present considered to be the preferred embodiments of the invention, modifications thereto will readily occur to those skilled in the art. It is not desired, therefore, that the invention necessarily be limited to the specific arrangements shown and described and it is intended to cover in the appended claim all such modifications as fall within the true spirit and scope of the invention.

We claim as our invention:

Apparatus for locating trouble sources which may be identified by the ultrasonic sounds emanating therefrom, comprising a gun stock, a narrow-beam ultasonic microphone assembly mounted on said gun stock for aiming at a suspect trouble area, a telescopic sight mounted on said gun stock in alignment with the axis of symmetry of said ultrasonic microphone assembly, battery-operated circuit means mounted on said gun stock and connected to the output of said microphone assembly to provide an amplified audio frequency signal proportional to the amplitude of the ultrasonic sound received by such assembly, and a speaker mounted on said gun stock driven by said circuit means.

References Cited by the Examiner

UNITED STATES PATENTS

| | | | |
|---|---|---|---|
| 1,886,914 | 10/1932 | Slichter | 73—69 |
| 2,031,919 | 2/1936 | Bennett et al. | 73—71.4 X |
| 2,324,305 | 7/1943 | Kurtz | 73—69 X |
| 2,414,695 | 1/1947 | Massa | 181—26 X |
| 2,447,333 | 8/1948 | Hayes | 340—10 |
| 2,459,162 | 1/1949 | Hayes | 181—26 |
| 2,460,316 | 2/1949 | Trent et al. | |
| 3,016,457 | 1/1962 | Brown et al. | 73—69 X |
| 3,019,637 | 2/1962 | Cook et al. | 73—67.8 X |
| 3,192,516 | 6/1965 | Simpkins et al. | 340—242 |

FOREIGN PATENTS

| | | |
|---|---|---|
| 1,061,773 | 12/1953 | France. |
| 576,165 | 10/1929 | Germany. |

RICHARD C. QUEISSER, *Primary Examiner.*

JOHN P. BEAUCHAMP, *Examiner.*